United States Patent [19]

Murphy et al.

[11] Patent Number: 4,826,050

[45] Date of Patent: May 2, 1989

[54] SPRAYING AND DOSING APPARATUS

[76] Inventors: Allan P. Murphy, 28 Hutchins Avenue, Dubbo, New South Wales 2830; John Toth, Unit 4, 10 Elizabeth St., Parramata, New South Wales 2150, both of Australia

[21] Appl. No.: 940,582

[22] Filed: Dec. 11, 1986

Related U.S. Application Data

[63] Continuation-in-part of Ser. No. 675,518, Nov. 28, 1984, abandoned.

[51] Int. Cl.⁴ .............................................. B65D 88/54
[52] U.S. Cl. .................................. 222/175; 222/309; 222/334
[58] Field of Search ............... 222/173, 175, 282, 309, 222/334, 372, 387–389, 391; 239/322, 152–154, 331–332, 526–527; 224/148, 153, 259, 261; 417/234, 392, 403

[56] References Cited

U.S. PATENT DOCUMENTS

| | | | |
|---|---|---|---|
| 2,789,396 | 4/1957 | Jernander et al. | 222/175 X |
| 2,889,084 | 6/1959 | Tour | 222/334 |
| 3,353,537 | 11/1967 | Knox et al. | 604/143 |
| 3,565,298 | 2/1971 | Ohlin | 222/309 |
| 3,604,592 | 9/1971 | Bacon et al. | 222/185 X |
| 3,802,511 | 4/1974 | Good, Jr. | 239/154 X |
| 3,945,571 | 3/1976 | Rash | 222/175 X |
| 3,987,869 | 10/1976 | Bowers | 222/175 X |

FOREIGN PATENT DOCUMENTS 2541213 3/1976 Fed. Rep. of Germany ...... 239/154
946078 3/1964 United Kingdom ................ 239/152

OTHER PUBLICATIONS

"Spray Gun Cuts Costs by More Than 75 PC", The Land, Jun. 17, 1982.

Primary Examiner—Michael S. Huppert
Attorney, Agent, or Firm—Howson & Howson

[57] ABSTRACT

In spraying liquid herbicides and insecticides, a predetermined dose is delivered in each operation of a dosing apparatus. The dosing apparatus comprises a piston-and-cylinder combination supported on a hangle. The piston is biased in one direction by a spring or by pressurized propellant, and movement of the piston in this one direction causes the liquid to flow into the cylinder through a check valve. Actuation of a trigger-operated valve releases pressurized propellant into the cylinder on the opposite side of the piston (or alternatively into an auxiliary cylinder) causing movement of the piston and discharge of the liquid through a second check valve and then through a spray nozzle. The dosing apparatus includes a portable backpack structure molded of a plastics material, and is especially suited for portable operation in remote locations. The backpack is formed with a reservoir for reagent and a compartment for removably holding a pressurized propellant container.

5 Claims, 4 Drawing Sheets

SPRAYING AND DOSING APPARATUS

CROSS-REFERENCE TO RELATED APPLICATION

This is a continuation-in-part of our pending application, Ser. No. 675,518, filed Nov. 28, 1984, now abandoned.

BACKGROUND OF THE INVENTION

The present invention relates to an apparatus for dispensing liquids such as herbicides and insecticides.

Contact herbicides have hitherto been applied to plantlife such as bushes and scrub in large quantity at low to medium concentration, usually in the form of spray delivered by a vehicle-mounted spraying apparatus. More inaccessible areas were reached by an operator carrying a backpack sprayer unit, and again the spray was liberally applied, reliance being placed upon the thorough wetting of the leaves to ensure absorption. Such herbicides are inactive upon soil, and depend for their effectiveness upon translocation from the leaf system to the root system.

Although various devices have been proposed for facilitating the charging and dispensing of liquid carriers, none of these attempts have provided a reliable and portable apparatus for dispensing a controllable amount of liquid at constant pressure for prolonged periods of time.

Many previous attempts combine the propellent gas with the liquid being dispensed, or charge the liquid under pressure prior to entry or inside the device, before spraying same. U.S. Pat. No. 3,353,537 to Knox et al discloses an inoculating instrument which, although overcoming the specific above-referenced problems, has itself several drawbacks which are obviated by the present invention.

U.S. Pat. No. 3,353,537 to Knox et al, discloses a high-speed inoculating or vaccinating instrument specifically for use on chickens and other fowl. The Knox device is therefore adapted for an extremely different field, that is, for high speed and very small dosage dispensing of a vaccine trough a needle. The device requires the use of an air compressor to provide the motive power, and dispenses a predetermined volume of liquid depending on the position of a master piston which must be screw-adjusted. The Knox device is considerably complex in construction, requiring a two-part piston with twin seals. The device as claimed and illustrated is cumbersome to operate and utilise as it stands, and even if it were desirous to increase the dimensions and capabilities of the Knox device to meet the operating characteristics of the present invention, such action would render the Knox device ungainly and unusable in a modified form. Further still, the Knox device requires the use of an air compressor, and therefore could not be provided as a portable unit for use in the field. Due to the provision of the threaded limit device at the rear of the Knox gun, the gun is restricted on its rearward stroke. That is, only a specified individual dosage may be dispensed, as opposed to a variable-sized dosage.

These and other disadvantages are obviated by the present invention which provides a light weight, portable dosing apparatus for applying liquid reagents in agricultural areas. Certain factors emerge as important in devising such an apparatus, including firstly, that herbicides and insecticides must be applied at an effective dosage level. Then the concentration and the area to which it is applied must be predetermined. Secondly, the apparatus is likely to be required in inaccessible places, so that portability is desirable. Thirdly as ejecting liquid by arm or hand operation is tiring when repeated, some form of preferred ejection is advisable. Fourthly it is useful to meter the liquid in discrete doses so that the sprayer may keep in mind the cost of the reagent.

The present invention provides a spraying and dosing apparatus for administering a reagent in a liquid carrier as a spray comprising:

a portable backpack structure moulded of plastics material and provided with:
  a reservoir adapted to contain a liquid comprising a reagent in a liquid carrier;
  a removable propellant vessel containing liquid petroleum gas under pressure;
  a regulator device adapted to said removable vessel to maintain said liquid petroleum gas at substantially constant pressure; and
a metering device comprising a cylinder having a piston movable therein, the piston and cylinder together forming an expansible chamber, spray nozzle means connected to said chamber for delivering a spray of liquid therefrom upon movement of the piston in a direction to contract said chamber, first check valve means connected between said chamber and said spray nozzle means for preventing flow of air into the chamber through said spray nozzle means upon expansion of said chamber, conduit means connected to deliver liquid from said reservoir of said portable backpack structure into said chamber, second check valve means in said conduit means for preventing flow of liquid from said chamber back to said reservoir upon contraction of the chamber, means, operable by the energy of said liquid petroleum gas in said propellant vessel, for moving said piston in a direction to cause said chamber to expand, thereby drawing said liquid from said reservoir of said portable backpack structure into said chamber, means operable by the pressure of said liquid petroleum gas in said propellant vessel for moving said piston in a direction to cause said chamber to contract, and manually operable valve means connected to deliver said liquid petroleum gas under pressure from said propellant vessel to said means operable by the pressure of said liquified gas;
whereby said valve means controls the flow of pressurized liquid petroleum gas, and said dosing apparatus utilizes said liquid petroleum gas pressure to eject said liquid from said chamber, the propellant liquid petroleum gas and the liquid to be sprayed remaining separate.

The metering device may be a dosing gun comprising a piston and cylinder supported on a handle, the cylinder having on one side of the piston a liquid inlet which is connectable to a reservoir of liquid and an outlet which leads to a spray head and a further inlet in the opposite side of the piston which is connectable to a source of pressurized propellant via a control valve.

In a preferred embodiment the piston is spring-biased to the charge position, and a piston rod extends out of the cylinder and carries an adjustable stop so the dose can be altered. The valve is incorporated as a trigger. The pressurized propellant is provided as a cylinder of liquified gas, for example LP gas, or industrial compressed air and the reagent is supplied from a reservoir, these two supplies being incorporated in a backpack. A handle for the gun is not essential but increases the comfort of use of the device.

BRIEF DESCRIPTION OF THE DRAWINGS

Various embodiments of the invention are now described with reference to the drawings in which.

DETAILED DESCRIPTION

Figure 1:
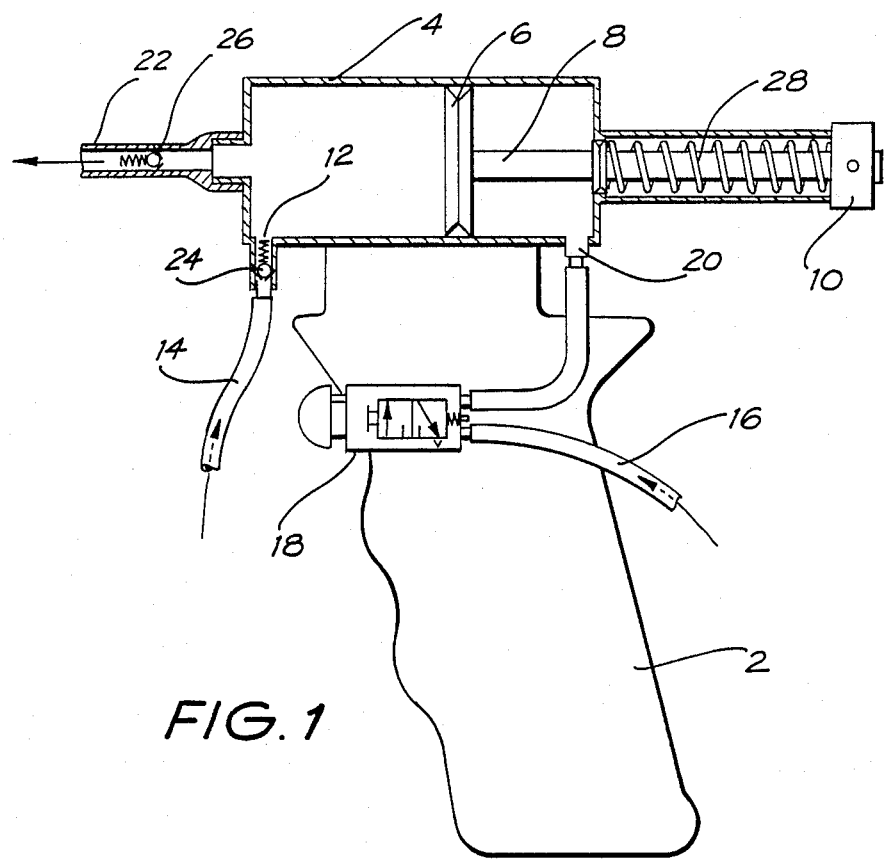
FIG. 1 is a diagram of the gun with the piston in midstroke.
Figure 4:
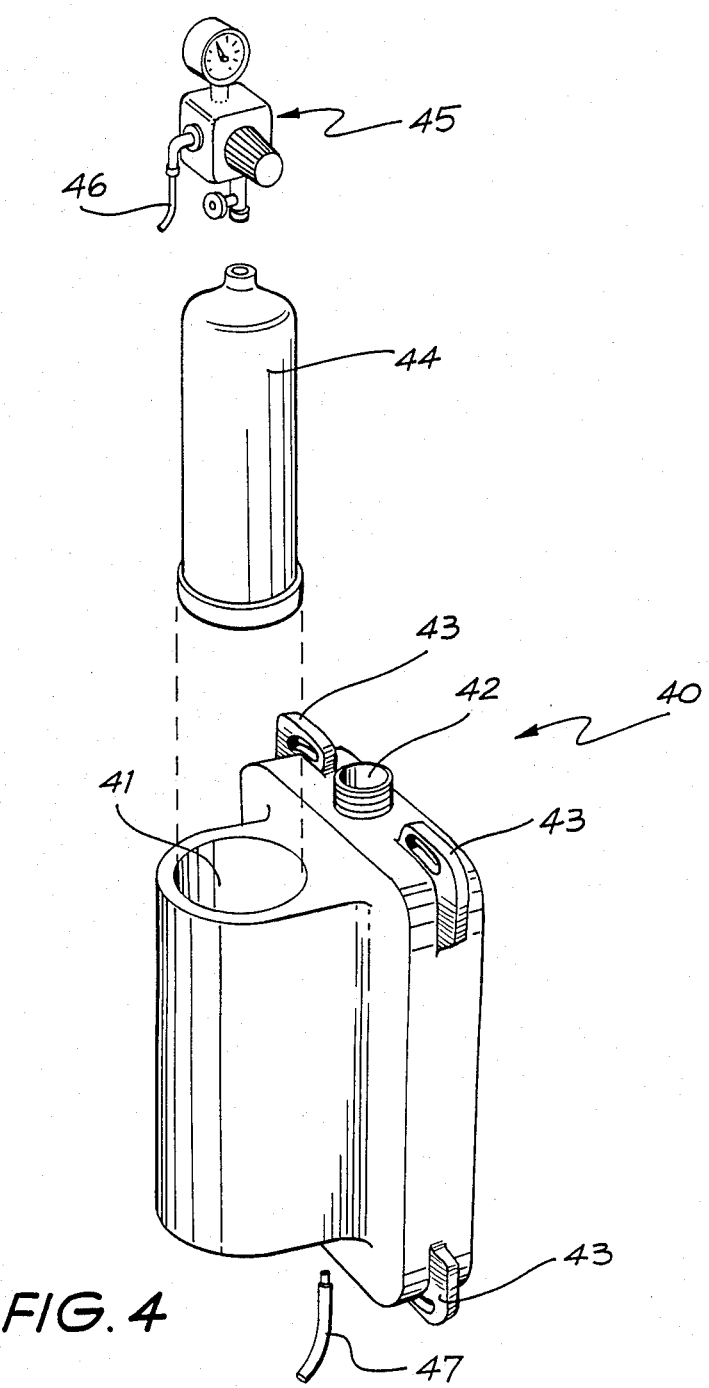
FIG. 4 is an exploded view of a backpack structure in accordance with the present invention.

Referring now to FIG. 1 a pistol butt 2 supports a cylinder 4 containing a plunger 6. A plunger rod 8 extends out of the cylinder 4 and carries an adjustable stop 10 which, by means of the spring 28, biases the plunger to the charged position. Referring to FIG. 4, a backpack contains a plastic vessel 40 containing herbicide and a cylinder 44 of compressed liquefied gas, or other pressurized propellant protected by a pressure regulator. Referring to FIG. 1, herbicide is supplied to the cylinder 4 through an inlet 12 by vinyl tube 14. Similarly, pressurized gas is supplied through vinyl tube 16 and through a trigger valve 18 to inlet 20 behind plunger 6. The cylinder discharges through tube 22, and a spray head sized to deliver droplets around 200 microns in diameter. Check valves 24, 26 ensure the cylinder charges under the influence of spring 28. Check valve 24 could alternatively be located at the suction outlet of the backpack.

Figure 2:
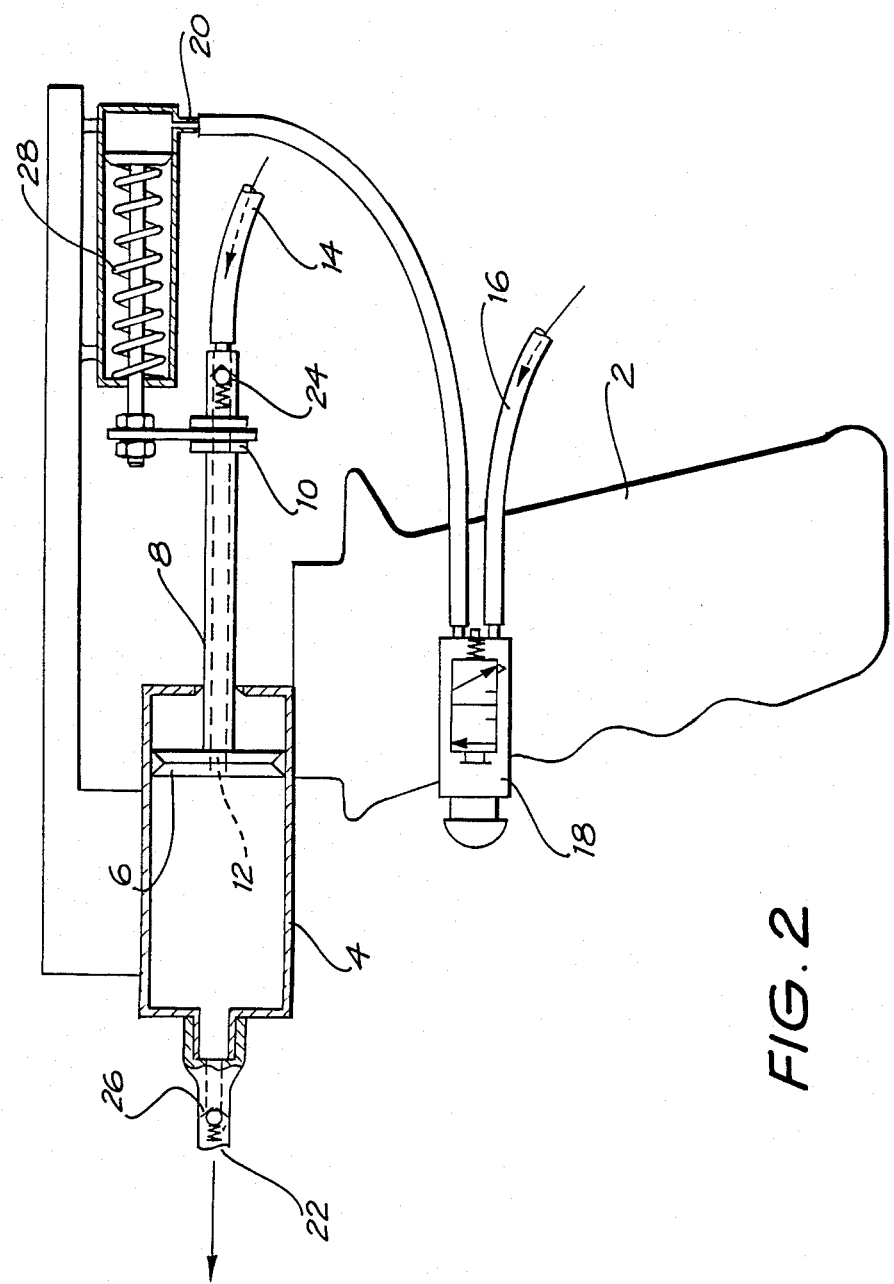
FIG. 2 is another version of the gun.

Referring to FIG. 2, similar parts are identifiable.

The embodiment of FIG. 2 works as follows. When valve 18 is opened, the pressurized propellant or gas forces the plunger to direct a wide angle spray for about 3 seconds against the compression of spring 28 and check valve 26. When the spray stops the trigger is released and spring pressure recharges the cylinder.

Figure 3:
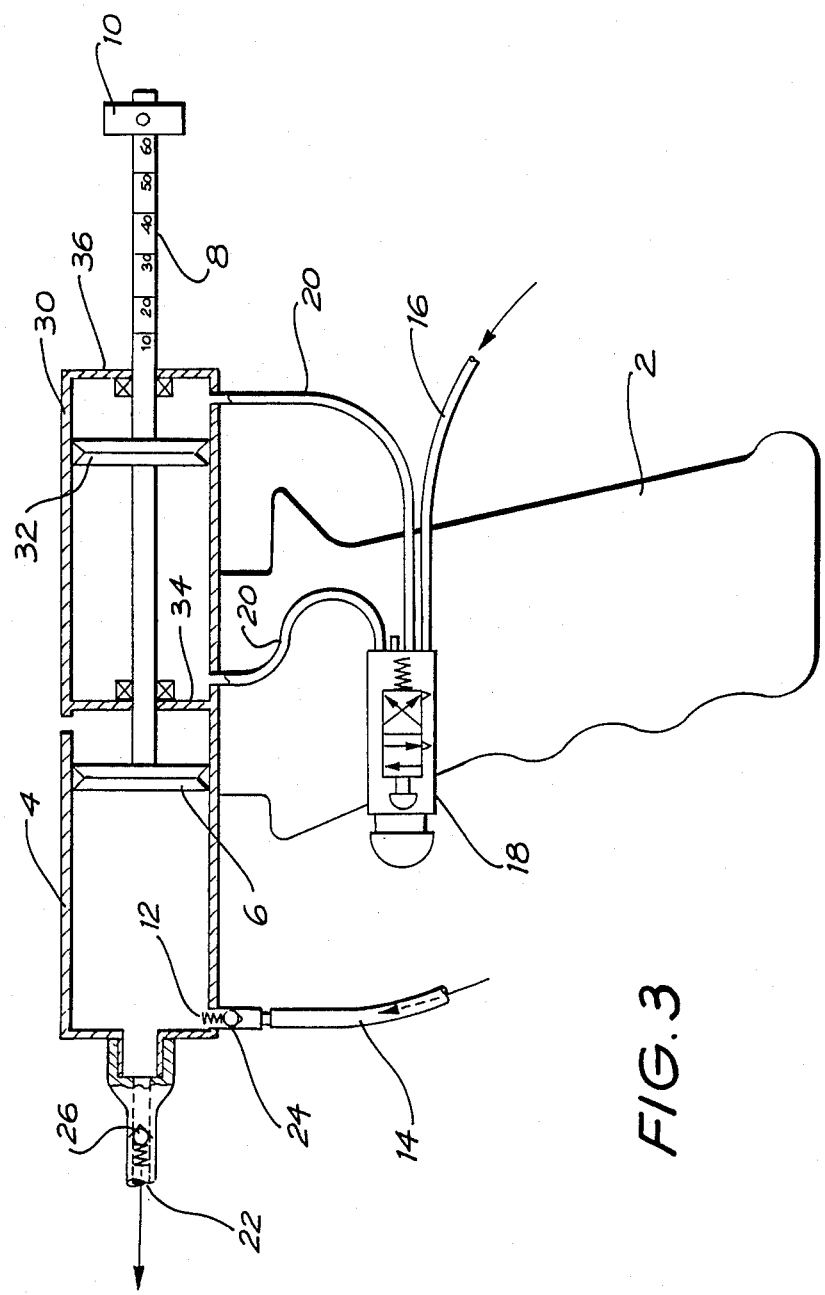
FIG. 3 is yet another version of the gun.

In FIG. 3, a second cylinder 30 and plunger 32 are provided integrally with the first cylinder and divided therefrom by a wall 34. Plunger rod 8 extends through wall 34 and the cylinder wall 36. Trigger valve 18 is a multi-way valve which switches gas from one side of the piston to another at the same time venting the emptying side to atmosphere, thus, the culinder 4 is charged and discharged under the influence of gas pressure.

In FIG. 4, is shown an exploded view of the lightweight backpack structure in accordance with the present invention. The backpack, generally designated by the numeral 40, is preferably moulded of lightweight plastics material, provided with a gas cylinder pouch 41 and a fluid reservoir 42 for carrying the liquid reagent. FIG. 4 also shows the backpack structure having strap eyelets 43 for connection to straps (not shown) disposed around the body of an operator. A rechargable gas cylinder 44, containing, for example, Liquid Petroleum (LP) Gas is housed in the gas cylinder pouch 41, and the liquid reagent is contained within the fluid reservoir 42. The gas cylinder 44 is provided with an adjustable pressure regulator 45 such that a desired pressure may be selected, and this pressure is maintained throughout the operation of the spraying and dosing apparatus. This avoids the pressure dropping as the operation progresses, as with most other apparatuses which are only fully effective when the operation is commenced, say, at the start of the day. A regulated pressure of gas is therefore supplied to the gun via the connecting tube 46. The liquid reagent, for example herbicide, is supplied in the fluid reservoir 42. The fluid reservoir is then closed with a screw cap, but firstly provided with a venting valve. The liquid reagent is supplied from the bottom of the fluid reservoir 42 via tube 47 to the cylinder of the gun. The specific backpack structure of the present invention therefore is distinguished, in that:

(a) it is lightweight and of simple construction;
(b) the chemical reservoir is not under pressure, thus, it is safe to use and of lightweight construction;
(c) a rechargable gas cylinder is easily inserted into the pouch;
(d) a regulator (preferably adjustable) is utilised on the pressure source, which maintains consistent operating pressure; and
(e) LP Gas (Liquid Petroleum Gas) is utilised as a power source, which has significant advantages to be detailed hereinbelow.

The main advantage of using LP gas instead of, for example, compressed air, is the ability to compress equivalent initial volumes of LP gas to approximately one-hundreth of the volume to which air may be compressed at similar pressures. To illustrate this point, a 0.34 kg LP gas cylinder at 135 psi would power the present invention for almost 1,000 operations on 50 ml doses. If the same 0.34 kg cylinder is utilised for compressed air at 135 psi (being the maximum pressure containable in such a cylinder) then 10 shots of 50 ml doses could be dispensed. In most farming situations therefore, a full day's work can be carried out, namely 6-8 hours, without having to return and refill the gas cylinder.

A further advantage of the present invention is that the chemical reservoir may be easily refilled as many times as required in the field during a single day's operation. Since the reservoir is not under pressure, the chemical herbicide may be topped up as required without the need to recharge or pressurize the unit, necessitated by prior art devices. This represents significant savings for the operator, since the need to utilise specialised refilling equipment is obviated, resulting in both financial and time savings. It is therefore not necessary for the operator to return to a refill machine, since same may be achieved quickly and easily on site.

This type of pack and gas will allow a farmer comfortably and accurately to foliar spray many bushes per day, even in very rough and almost inaccessible country, where most other forms of chemical treatment are impossible.

These guns could be used for many operations other than chemical weed control, such as cattle drenching, treatment of grain storage against weevils, general insect and pest control both internal and external of the animal being sprayed.

It is economical in that each trigger operation represents a direct cost in terms of herbicide which is easily appreciated by the user.

In another version the spray head is detachable for mounting in a downward spraying direction and is fixed to a race through which sheep are driven one by one. The trigger valve is modified for operation by a lever worked by the passing body of a sheep. The operation of the lever self-doses the sheeps' backs with pour-on type insecticide. Cattle are similarly treated for external and internal parasites. A coarse spray head reduces ejection time to one second.

We claim:

1. A lightweight dosing apparatus for administering a reagent in a liquid carrier as a spray comprising:

a portable backpack structure provided with:

a reservoir adapted to contain a liquid comprising a reagent in a liquid carrier;

a removable propellant vessel containing liquid petroleum gas under pressure;

a regulator device adapted to said removable vessel to deliver propellant gas from said propellant vessel at a substantially constant pressure; and means forming first and second expansible chambers comprising cylinder means and piston means reciprocably movable therein and causing each of the chambers to expand as the other contracts, the piston area in the first of said chambers being at least approximately as large as the piston area in the second of said chambers, spray nozzle means connected to the first chamber for delivering a spray of liquid therefrom upon contraction of said first chamber, first check valve means connected between said first chamber and said spray nozzle means for preventing flow of air into said first chamber through said spray nozzle means upon expansion of said first chamber, conduit means connected to deliver liquid from said reservoir of said portable backpack structure into said first chamber, second check valve means in said conduit means for preventing flow of liquid from said first chamber back to said reservoir upon contraction of said first chamber, means for moving said piston means in a direction to cause said first chamber to expand, thereby drawing said liquid from said reservoir of said portable backpack structure into said first chamber, and manually operable valve means connected to deliver propellant gas under pressure from said regulator device to said second chamber to cause expansion of said second chamber and simultaneous contraction of said first chamber when the valve means is in a first position; whereby said valve means controls the flow of propellant gas from said regulator device, and said dosing apparatus utilizes the pressure of said propellant gas to eject said liquid from said first chamber, the propellant gas and the liquid to be sprayed remaining separate.

2. A dosing apparatus as claimed in claim 1, in which the means for moving said piston means in a direction to cause said first chamber to expand is a spring biasing said piston means in the direction of expansion of said first chamber.

3. A dosing apparatus as claimed in claim 1, wherein the means for moving said piston means in a direction to cause said first chamber to expand comprises a third expansible chamber formed by said piston and cylinder means, said third chamber being expansible as said first chamber expands, in which said manually operable valve means includes means connected to deliver propellant gas under pressure from said propellant vessel to said third chamber to cause expansion of said first and third chambers when the valve means is in a second position different from said first position, whereby ejection and charging are both performed under propellant gas pressure.

4. A dosing apparatus according to claim 1 including a piston rod connected to said piston means and extending out of the cylinder means through a wall of said second expansible chamber, a fixed stop, and adjustable stop means carried by said piston rod and engageable with said fixed stop as the second chamber expands, for limiting movement of the piston means and thereby limiting contraction of said first chamber.

5. A dosing apparatus according to claim 1 in which the propellant vessel is a cylinder, in which the reservoir of said portable backpack structure is an enclosure molded of a plastics material, said enclosure having walls, and in which the portable backpack structure includes a pouch located on the exterior of one of the walls of said enclosure and molded as a unit therewith, said pouch being open at its upper end and having interior wall means substantially conforming to the shape of the exterior of said propellant vessel, said pouch removably receiving said propellant vessel.

* * * * *